United States Patent Office 2,753,732
Patented July 10, 1956

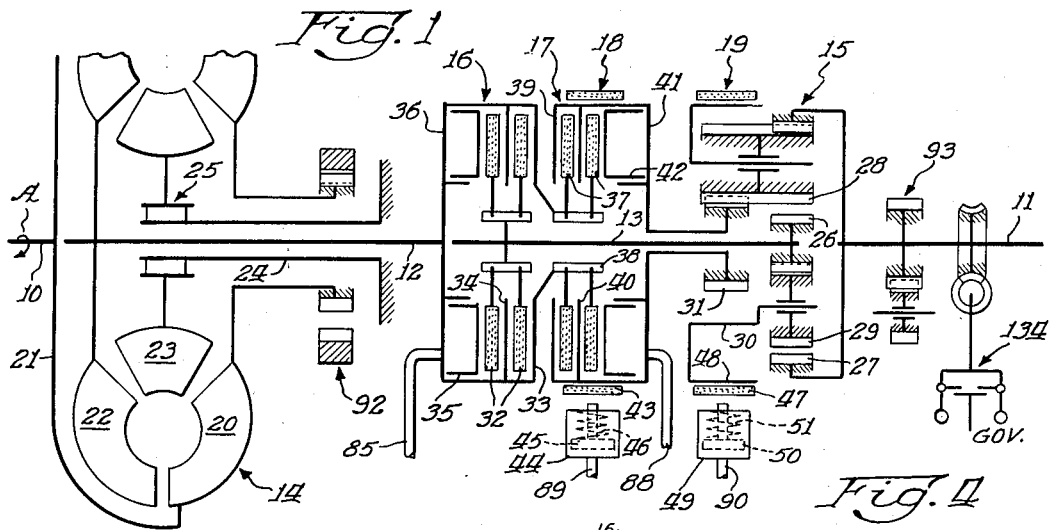

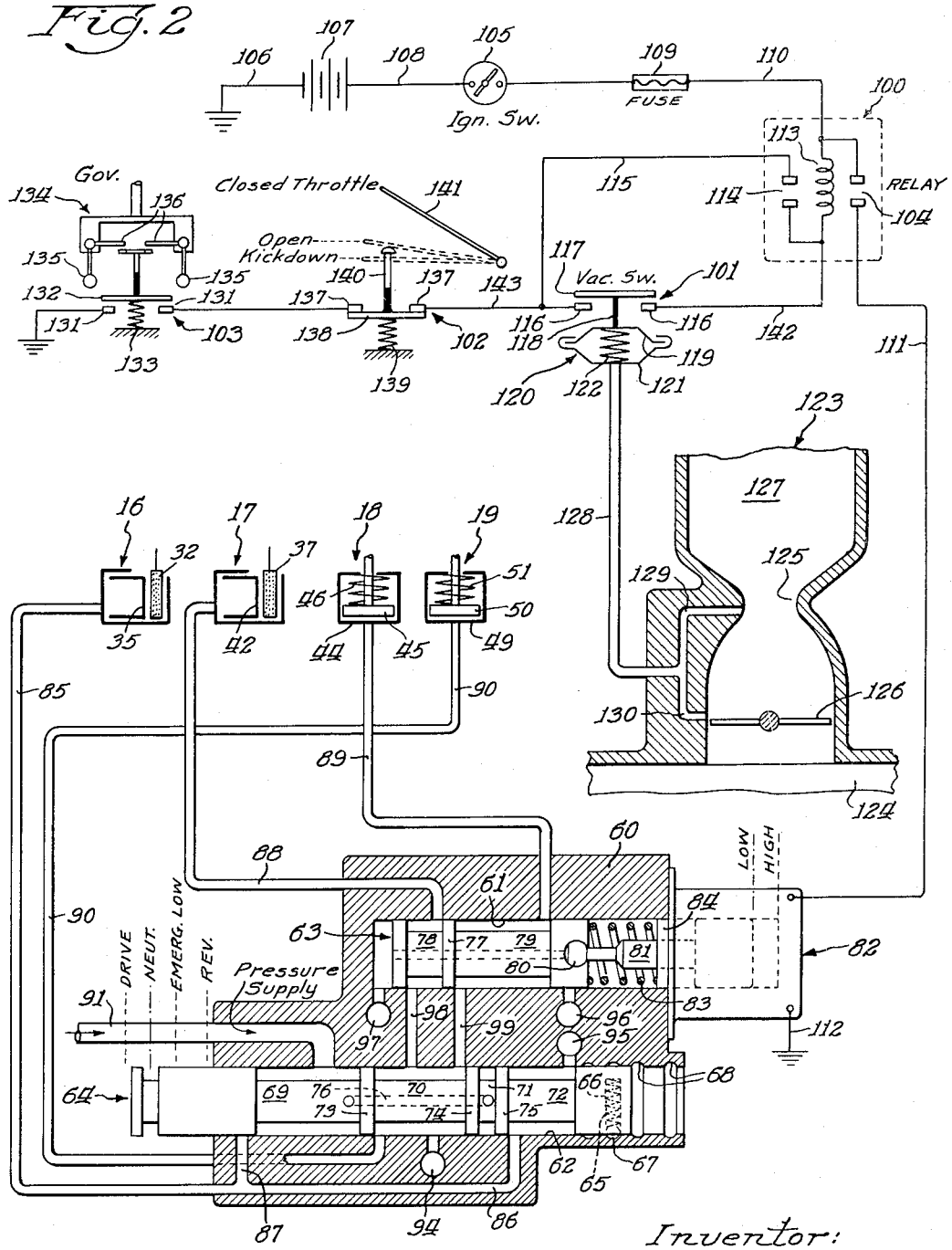

2,753,732
TRANSMISSION CONTROL SYSTEM

William V. Harrison, Muncie, Ind., assignor to Borg-Warner Corporation, Chicago, Ill., a corporation of Illinois Application January 11, 1951, Serial No. 205,505

6 Claims. (Cl. 74—472)

The present invention relates to automotive vehicle transmissions and more particularly to control systems for an automatic transmission for automotive vehicles.

The principal object of the present invention is to provide a vacuum motor responsive to a differential vacuum consisting of a combination of vacuums from a plurality of different sources, which vacuum motor is effective to control a fluid pressure control system of an automatic vehicle transmission so as to effect a change in the engagement of the engaging means located between the driving and driven shafts of the transmission.

It is another object of the present invention to provide an automatic transmission control system employing a shift valve having a position corresponding to a relatively low speed ratio power train and a position corresponding to a relatively high speed power train, which shift valve is normally in its low speed ratio position but which is moved to its high speed ratio position under the control of a vacuum motor responsive to a differential vacuum which is provided by combining the vacuum from two different sources.

Another object of the present invention is to provide an automatic transmission control system of the general type referred to above wherein the vacuum motor is controlled by a differential vacuum comprising a combination of manifold vacuum provided by the vehicle fuel intake manifold and carburetor vacuum provided by the carburetor for the vehicle engine.

A further object of the present invention is to provide a vacuum motor for controlling a shift from a relatively low to a relatively high speed ratio power train through an automotive vehicle transmission wherein the vacuum motor is connected to both the manifold of the vehicle engine and to the carburetor in the vicinity of carburetor Venturi whereby the shift is effected automatically when the differential vacuum increases to a predetermined value and the vehicle is traveling above a predetermined minimum speed.

A further object of the invention is to provide a vacuum motor and means for operating such motor for controlling the shift of an automotive vehicle transmission from a relatively low speed ratio to a relatively high speed ratio wherein the shift point is controlled more nearly in accordance with the power requirements of the vehicle than would be obtained if the vacuum motor were controlled solely by the manifold vacuum.

It is well known that the vacuum in the fuel intake manifold of the engine of an automotive vehicle is quite erratic. When the vacuum motor for controlling the shift from a low speed ratio to a high speed ratio is itself controlled by a differential vacuum comprising a combination of manifold vacuum and carburetor vacuum, the shift point can be controlled far more easily. This is because the combined carburetor and manifold vacuum covers a smaller range, is steadier and like manifold vacuum, is responsive to throttle opening but not nearly so erratic.

The above and other objects and advantages of the present invention will become apparent from the following detailed description when read in conjunction with the accompanying drawings, wherein:

Fig. 1 is a diagrammatic illustration of a transmission of the type with which the present invention is applicable;

Fig. 2 is a schematic illustration of a transmission control system for controlling a transmission of the type shown in Fig. 1 and showing schematically the features of the present invention;

Fig. 3 is a diagram showing the relation between manifold vacuum and differential vacuum under road load conditions;

Fig. 4 is a diagram showing the relation between manifold vacuum and differential vacuum at various points of shift between intermediate and high speed drive and occurring at different speeds, depending on throttle opening;

Fig. 5 is a graph showing differential vacuum and manifold vacuum curves corresponding to full open throttle positions and to half open throttle positions of the vehicle accelerator; and Fig. 6 is a graph showing differential vacuum plotted against vehicle speed for various degrees of throttle opening.

With reference to the drawings, wherein like reference numerals in the different views identify similar parts, and with reference particularly to Fig. 1, the transmission illustrated comprises a drive shaft 10, a driven shaft 11, an intermediate shaft 12 and a second intermediate shaft 13. The shafts 12 and 13 are piloted by any suitable operating means (not shown) with respect to the shafts 10 and 11, and all of these shafts are intended to be rotatably disposed and held in alignment with each other within a suitable transmission casing (not shown). The drive shaft 10 is adapted to be connected to the crankshaft of an internal combustion driving engine (not shown) of the vehicle and the driven shaft 11 is adapted to be connected to the driving wheels (not shown) of the vehicle.

The transmission comprises in general, a hydraulic torque converter 14, a planetary gear unit 15, friction clutches 16 and 17 and friction brakes 18 and 19. The hydraulic torque converter 14 comprises a bladed impeller 20 connected to be driven by the flywheel 21 which in turn is connected with the driving shaft 10. The torque converter 14 comprises also a bladed runner or driven element 22 and a bladed stator or reaction element 23. The runner 22 is connected to drive the intermediate shaft 12, and the stator 23 is mounted to rotate in one direction on a stationary sleeve shaft 24. A one-way roller brake 25 of any suitable construction is disposed between the stator 23 and the shaft 24 and functions to allow rotation of the stator in the forward direction, that is, in the same direction the shaft 10 is driven which is indicated by the arrow A, and to brake rotation of the stator 23 in the reverse direction. The three vaned elements 20, 22, and 23 are in the same fluid housing which is formed by the impeller 20, and the function of the torque converter 14 is to drive the intermediate shaft 12 initially at increased torque due to the function of the reaction element 23 and the brake 25 holding the reaction element against reverse rotation and subsequently to drive the shaft 12 from the shaft 10 substantially at the same speed and with no increase in torque when the one-way brake 25 has ceased to hold the reaction element 23 against reverse rotation and the element 23 is rotating freely in the forward direction. The function of the torque converter 14 is similar to well-known converters of this type and hence further description of the operation and detailed construction thereof is not deemed necessary.

The planetary gear set 15 comprises a sun gear 26, a ring gear 27, an elongated planet gear 28, a planet gear 29, a carrier 30 for the gears 28 and 29 and a second sun gear 31. The gears 28 and 29 are in mesh and the gear 28 is also in mesh with the ring gear 27, while the planet gear 29 is also in mesh with the sun gear 26. The planet gear 28 is also in mesh with the sun gear 31. The ring gear 27 is connected with the driven shaft 11, and the sun gear 26 is connected with the intermediate shaft 13. Both of the sun gears 26 and 31 are adapted to be driven from the shaft 12, the sun gear 26 being connected with the shaft by means of the clutch 16 and the sun gear 31 being connected with the shaft by means of the clutch 17.

The clutch 16 comprises clutch discs 32, pressure plates 33 and 34 and a piston 35. The discs 32 are splined to the shaft 13 and are adapted to be compressed in frictional relation with the pressure plates 33 and 34 by means of the piston 35. The plate 33 constitutes a part of a casing 36 connected with the shaft 12, and the plate 34 is connected to rotate with the casing 36. The piston 35 is slidably disposed in a suitable cavity within the casing 36.

The clutch 17 is somewhat similar in construction and comprises friction discs 37 splined onto an extension 38 of the casing 36, pressure plates 39 and 40 fixed with respect to a casing 41 and a piston 42 slidably disposed within a suitable cavity within the casing 41 and adapted to compress the discs 37 in frictional engagement with the plates 39 and 40 and itself. The casing 41 is fixed to the sun gear 31.

The brake 18 comprises a brake band 43 adapted to engage the outer surface of the casing 41 for thereby braking the sun gear 31 connected with the casing. The brake is adapted to be applied by means of a fluid pressure motor 44 which comprises a piston 45 acting on the band by any suitable linkage (not shown) and a spring 46 effective for yieldably holding the piston in its brake disengaging position.

The brake 19 comprises a brake band 47 effective on a drum portion 48 of the carrier 30 for braking the carrier. A fluid pressure motor 49 is provided for engaging the band and comprises a piston 50 acting on the band by any suitable linkage (not shown) and a spring 51 effective for yieldably holding the piston in its brake disengaging position.

The illustrated transmission provides low, intermediate and high speed forward drives and a drive in reverse. With both clutches 16 and 17 and the brakes 18 and 19 disengaged, the transmission is conditioned for neutral. For low speed forward drive the clutch 16 and the brake 19 are engaged, and a power train is thereby completed from the drive shaft 10 through the torque converter 14 and its runner 22 to the intermediate shaft 12, through the clutch 16, the shaft 13, and the planetary gear set 15 to the ring gear 27 and the driven shaft 11 connected therewith. Since there is a pair of planet gears 38 and 29 between the sun gear 26 and the ring gear 28 and since the carrier 30 is held stationary by the brake 19, the ring gear 27 is rotated at a reduced speed with respect to, and in the same direction as, the sun gear 26, and there are thus two torque multipliers in the power train, namely, the hydraulic torque converter 14 and the planetary gear set 15.

The second speed forward drive power train is subsequently completed by disengaging the brake 19 and engaging the brake 18 while the clutch 16 remains engaged. This drive is the same as in low speed forward drive except that the sun gear 31 instead of the carrier 30 is utilized as the reaction element of the gear set, and the ring gear 27 and the driven shaft 11 are driven at a higher but reduced speed with respect to the sun gear 26.

The high speed forward drive may be subsequently completed by disengaging the brake 18 and engaging the clutch 17. In this case the drive is from the drive shaft 10 through the torque converter and its runner 22 to the intermediate shaft 12 and thence through the clutch 16 and 17, the sun gears 26 and 31 and the remainder of the planetary gear set 15, including the ring 27, to the driven shaft 11. When both of clutches 16 and 17 are engaged this locks up the planetary gear set so that all of its elements are rotating together as a unit and there then exists a direct drive between the shafts 10 and 11. Although the torque converter may, for this drive also, convert torque it is contemplated that the torque converter shall generally be used in this drive as a simple fluid coupling, with the bladed reaction member 23 rotating along with the impeller 20 and runner 22.

A drive in reverse is completed by engaging the clutch 17 and brake 19. The drive in this case is from the drive shaft 10 through the converter 14 and its runner 22 to the intermediate shaft 12, through the clutch 17, the sun gear 31, and the remainder of the planetary gear set 15 to the driven shaft 13. The carrier 30 in this case functions as the reaction element of the planetary gear set, and since there is only the single planetary gear 28 between the driving sun gear 31 and the driven ring gear 27, the ring gear and thereby shaft 11 are rotated in the reverse direction at a reduced speed with respect to the shaft 12. The converter 14 may also convert torque for this drive the same as for the forward drive.

Turning now to Fig. 2, the control system for controlling the selection of the various drives through the transmission shown in Fig. 1 will now be described.

A valve block 60 is provided with a pair of bores 61 and 62 within which a shift valve 63 and a manually operable selector valve 64 are respectively reciprocable. The selector valve 64 has an internal radial slot 65 within which a spring 66 is seated and the spring 66 urges a ball 67 into any one of a plurality of peripheral grooves 68, depending upon the position of the valve 64 to thereby retain the valve 64 in its manually selected position. The valve 64 is provided with grooves 69, 70, 71 and 72 and a plurality of lands 73, 74 and 75 are provided for separating the grooves. The valve 64 is axially bored to provide a conduit 76 therein for respectively connecting the grooves 69 and 71.

The shift valve 63 is provided with a land 77 that separates a pair of grooves 78 and 79. The valve 63 is bored to receive a ball shaped member 80 integrally formed on an armature 81 of a solenoid 82. A compression spring 83 is positioned between the valve 63 and a block 84 and urges the valve 63 to its left-hand position whenever the solenoid 82 is deenergized. This left-hand position of the valve 63 is its low speed position and when the solenoid 82 is energized the armature 81 moves to the right, thereby compressing the spring 83 and also moving the valve 63 to its right-hand or high speed drive position.

The chamber behind the piston 35 of the clutch 16 is connected to a fluid conduit 85 that communicates with the bore 62 by means of two branch conduits 86 and 87. The chamber behind the piston 42 of the clutch 17 communicates with the bore 61 by means of a conduit 88. The operating cylinder 44 of the brake 18 is in communication with the bore 61 by means of a conduit 89 and the cylinder 49 of the brake 19 communicates with the bore 62 by means of a conduit 90. It is apparent, whenever fluid under pressure is supplied to the conduits 85, 88, 89 or 90, the clutches and brakes 16, 17, 18 or 19 are respectively engaged.

A pressure supply conduit 91 supplies the necessary fluid under pressure for operating the various clutches and brake, being in communication with the bore 62, and it is contemplated that fluid under pressure will be supplied to the conduit 91 by means of either or both a drive shaft pump 92 and a driven shaft pump 93. It is further contemplated that the pressure of the fluid in the conduit 91 may be regulated as desired in any well-known manner so that it will not exceed a predetermined value. The bore 62 communicates with a pair of bleed conduits 94 and 95 which lead to a sump (not shown) and the bore 61 communicates with a pair of bleed conduits 96 and 97 which also lead to the sump. The sump with which each of the bleed conduits 94—97 is connected constitutes a source of fluid for the pumps 92 and 93.

The selector valve 64 is shown in its neutral position and is retained in this position by means of the ball 67 which is seated in the groove 68 corresponding to the neutral position of the valve 64. Under this condition each of the clutches and brakes 16, 17, 18 and 19 are bled. The bleed circuit for the clutch 16 extends through the conduits 85 and 86, and through the groove 72 to the bleed conduit 95. The bleed circuit for the clutch 17 extends through the conduit 88, groove 78, through a conduit 98, which connects the bore 61 with the bore 62, through the groove 70 into the bleed passage 94. The bleed circuit for the brake 18 extends through the conduit 89 and groove 79 to a conduit 99 interconnecting the bores 61 and 62, through the groove 70 and to the bleed passage 94. When the valve 64 is in its neutral position the pressure supply conduit 91 communicates with the groove 69, conduit 76 and groove 71, but there are no outlets from either of the grooves 69 or 71 at this time.

When the selector valve 64 is moved to its emergency low position the groove 69 communicates with the conduit 90 and the groove 71 communicates with the conduit 86 and therefore fluid under pressure is supplied to both the clutch 16 and the brake 19 to cause them to become engaged. The fluid circuit for actuating the clutch 16 extends from the pressure supply conduit 91 through the groove 69, through the conduit 76 and groove 71, and through conduit 86 to the piston 35. The fluid circuit for actuating the brake 19 extends from the pressure supply conduit 91, through the groove 69, and through the conduit 90 to the cylinder 49. At this time the clutch 17 and the brake 18 are bled through the bleed passages previously described when the selector valve 64 was positioned in its neutral position.

Movement of the selector valve 64 to its reverse position causes fluid circuits to be established for actuating the clutch 17 and the brake 19 and for bleeding the clutch 16 and the brake 18. The actuating circuit for the clutch 17 extends from the pressure supply conduit 91 through the groove 69, through the conduit 98 and groove 78, and through the conduit 88 to the piston 42. The circuit for actuating the brake 19 extends from the fluid pressure supply conduit 91, through the groove 69, and through the conduit 90 to the brake operating cylinder 49. When the selector valve 64 is positioned in its reverse position the clutch 16 is bled through a circuit extending through the conduit 85 and groove 70 to the bleed passage 94. The brake 18 is bled at this time through the conduit 89, groove 79, conduit 99, and groove 70 to the bleed passage 94.

When the selector valve 64 is moved to its drive position the groove 71 is opposite the conduit 99 and if the solenoid 82 is deenergized at this time the solenoid operated shift valve 63 is in the position as shown whereby the clutch 16 and the brake 18 are actuated which establishes the second speed drive ratio through the transmission. The fluid pressure supply circuit for actuating the clutch 16 extends from the fluid pressure supply conduit 91, through the groove 69 and conduits 87 and 85 to the clutch piston 35. The fluid circuit for actuating the brake 18 extends from the fluid pressure supply conduit 91, through the groove 69, conduit 76, groove 71 and conduit 99, and through the groove 79 and conduit 89 to the brake operating cylinder 44. Under this condition the clutch 17 and the brake 19 are bled through the same bleed circuits as existing when the selector valve 64 is in its neutral position.

When the selector valve 64 occupies its drive position and the solenoid 82 is energized, actuating circuits are established for operating both clutches 16, 17 and bleeding both brakes 18 and 19. The clutch 16 is actuated at this time by fluid passing over the same circuit as previously traced when it was engaged during the second speed drive ratio but instead of the groove 79 being in communication with the conduit 99, the groove 78 communicates with the conduit 99 and therefore the clutch 17 is actuated by means of fluid passing through a circuit extending from the pressure supply conduit 91, through the groove 69, conduit 76, groove 71 and conduit 99, through the groove 73 and conduit 88 to the operating piston 42 of the clutch 17. The brake 18 is bled at this time over a circuit extending through the conduit 89 and groove 79, to the bleed passage 96. The brake 19 is bled through the same circuit as previously traced during the discussion of neutral conditions.

The electrical circuit for controlling the energization of the solenoid 82 to effect shifts from intermediate speed ratio to high speed ratio and vice versa will now be described. This circuit includes a relay 100, a vacuum switch 101, a kickdown switch 102 and a governor operated switch 103. The relay 100 is provided with a pair of contacts 104 which, when closed at a time when an ignition switch 105 is also closed, complete a circuit to the solenoid 82 that extends from ground over a lead 106, through the vehicle battery 107, over a lead 108, through the ignition switch 105 and a fuse 109, over a lead 110, through the contacts 104 and over a lead 111 to one terminal of the solenoid 82 thence through the solenoid 82 and over a lead 112 to ground. The relay 100 has a winding 113 and a second pair of contacts 114, which, when closed, bridge or provide a circuit over a lead 115 in parallel with the vacuum switch 101. Both of the contact pairs 104 and 114 are designed to close when the relay 100 is energized.

The vacuum switch 101 consists of a pair of contacts 116 and a bridging arm 117 which is actuated by means of a plunger rod 118, connected to a membrane 119 of a vacuum motor 120. The vacuum motor 120 also includes a casing 121 with which the membrane 119 is sealingly connected. A compression spring 122 urges the membrane 119 upwardly to thereby constantly tend to retain the bridging arm 117 in the position shown whereby the vacuum switch 101 is open. When vacuum is admitted into the casing 121, if it is a sufficiently high vacuum, it overcomes the force of the compression spring 122 and draws the membrane 119 and bridging arm 117 downwardly to thereby close the vacuum switch 101.

A carburetor for the vehicle is shown schematically and represented generally by reference numeral 123. The carburetor 123 is mounted above the manifold of the vehicle engine which is designated by reference numeral 124. The carburetor 123 is provided with the usual Venturi 125 and butterfly valve 126. As is well known, air, under atmospheric pressure, rushes into an upper chamber 127 of the carburetor and when it passes through the carburetor Venturi 125, the pressure thereof is reduced to some value less than atmospheric pressure. Since the pressure of the air as it passes through the venturi 125 is less than atmospheric pressure, this air provides a carburetor vacuum which is normally used to suck fuel into the carburetor.

A vacuum conduit 128 which is connected to the vacuum motor 120 leads to the carburetor 123 and has two branch conduits 129 and 130 connected therewith. The branch conduit 129 communicates with the inside of the carburetor 123 in the vicinity of the Venturi 125 and therefore provides a passageway for admitting vacuum from this portion of the carburetor to the conduit 128. The venturi 125 therefore provides a source for the carburetor vacuum which is supplied to the conduit 129. The conduit 130 is connected such that it will transmit manifold vacuum to the conduit 128. It is therefore apparent that the vacuum in the conduit 128 and consequently also the vacuum in the casing 121 of the vacuum motor 120 comprises a combination of vacuum obtained from two sources, namely, the space within the carburetor in the vicinity of the venturi 125 and the manifold 124. When the vacuum within the casing 121, which constitutes a differential vacuum comprising a combination of carburetor vacuum and manifold vacuum, increases to a predetermined value, preferably approximately 2.5 inches of mercury, it retracts the membrane 119, thereby overcoming the spring 122 in order to close the switch 101.

The governor switch 103 comprises a pair of contacts 131 and a bridging arm 132 which is normally retained disengaged from the contacts 131 by means of a spring 133. A governor 134 is connected to rotate with the driven shaft 11 and when its rotational speed increases to a certain predetermined value, preferably approximately 13 M. P. H., a pair of weights 135 swing outwardly sufficiently to pivot a pair of arms 136, which in turn cause the bridging arm 132 to bridge the contacts 131 and close the switch 103.

The kickdown switch 102 comprises a pair of contacts 137 and a bridging arm 138 that is normally urged toward engagement with the contacts 137 by a spring 139. A plunger rod 140, connected with the bridging arm 138 is designed to be engaged by an accelerator pedal 141 whenever the accelerator pedal 141 is moved beyond a full open throttle position to a kickdown position. When the accelerator pedal 131 is moved to its kickdown position it engages the rod 140 and opens the kickdown switch 102.

When the vehicle is traveling with the transmission operating in second speed forward drive, the differential vacuum is above the value necessary to cause closure of the vacuum switch 101, the accelerator pedal is positioned anywhere between its closed and open throttle position, and the governor switch 103 is closed due to the fact that the speed of the vehicle is above the required speed for closing the switch 103, an energizing circuit is established for energizing the winding 113 of the relay 100. This circuit extends from ground over lead 106, through battery 107, lead 108, ignition switch 105, fuse 109, lead 110, through the winding 113 of the relay 100, over a lead 142, through the closed vacuum switch 101, over a lead 143, through the kickdown switch 102 and governor switch 103 to ground. When the winding 113 of the relay 100 becomes energized its contact pairs 114 and 104 close. Closure of the contact pair 114 provides a locking or keeper circuit for the relay 100 which extends over the lead 115 to the lead 143, thereby causing the relay 113 to remain energized irrespective of the fact that the differential vacuum in the casing 121 of the vacuum motor 120 may subsequently decrease to a value insufficient to retain the vacuum switch 101 closed. Closure of the contact pair 104 completes the previously traced energizing circuit to the solenoid 82 and upon energization of the solenoid 82 it pulls its armature 81 to thereby move the shift valve 63 to its high speed position. Since it was assumed that the vehicle was operating in intermediate speed prior to the energization of the relay 100, this movement of the valve 63 to its high speed position establishes the previously traced fluid circuits for actuating the clutches 16 and 17 and bleeding the brakes 18 and 19. High speed forward drive ratio is therefore established in the vehicle transmission.

The high speed forward drive ratio or direct drive through the vehicle transmisison is maintained as long as the relay 100 is energized. Opening of either the governor controlled switch 103 or the kickdown switch 102 brakes the energizing circuit for the relay 100 and thus causes the solenoid 82 to be deenergized, thereby permitting the spring 83 to move the shift valve 63 back to its second speed drive ratio position. It is therefore apparent that movement of the accelerator pedal 141 to its kickdown position or decrease of the speed of the vehicle to a value insufficient to rotate the governor 134 fast enough to cause the switch 103 to remain closed causes the speed ratio through the transmission to change from high speed ratio to intermediate speed ratio.

Fig. 3 shows the relationship between manifold vacuum and differential vacuum when the vehicle is operating under substantially road load conditions. It is apparent that the differential vacuum varies with manifold vacuum, but varies over a smaller range and is therefore steadier.

Fig. 4 shows the relationship between manifold vacuum and differential vacuum at the shift point between intermediate and high speed drives for different speeds of the vehicle. It will be noted that at the shift point at approximately 13 M. P. H. the differential vacuum is higher than 2.5 inches of mercury, but this shift point is governor controlled. The values for the differential vacuum and manifold vacuum correspond substantially to road load conditions in Fig. 4 and this figure shows how manifold vacuum drops off as the speed at which the shift to high speed drive occurs increases.

Fig. 5 shows curves corresponding to the differential and manifold vacuums when the throttle is held at its full throttle position and also at its half open throttle position. The curve corresponding to manifold vacuum under full open throttle is represented by reference numeral 144 and the curve corresponding to differential vacuum under full open throttle is indicated by reference numeral 145. The curve corresponding to half open throttle manifold vacuum is represented by reference numeral 146 and the differential vacuum curve when the throttle is half open is represented by reference numeral 147. The conditions will be considered when the manifold vacuum alone is used to control the shift from intermediate to high speed ratio. Under this condition if the throttle is opened wide and held open the manifold vacuum will drop almost immediately to near zero, as indicated by curve 144, and then as the speed of the vehicle increases, the manifold vacuum will slowly rise. It can be assumed, for example, that the vacuum picks up to approximately one inch of mercury under this condition when the vehicle speed reaches 40 M. P. H. A vacuum switch set to close at this value of the manifold vacuum would effect a shift from intermediate to high speed ratio and this could be called the high limit shift point under wide open throttle.

If the throttle is opened to approximately its half open position the manifold vacuum will drop momentarily to near zero, as in the case when the throttle is fully open, and then rise almost immediately to some value greater than one inch of mercury as indicated by curve 146. Under this condition of half open throttle the shift from intermediate to high speed ratio will occur almost as soon as the throttle is cracked and cannot be controlled. Thus it is apparent that the shift cannot be satisfactorily controlled except in the instance where the throttle is wide open.

When the throttle is moved to a wide open position and held there the differential vacuum increases with the speed of the vehicle from near zero to a value of approximately 2.5 inches of mercury when the vehicle reaches a speed of approximately 40 M. P. H. When the accelerator is moved to a half open throttle position the differential vacuum also increases gradually, although more rapidly than in the case where the throttle is fully open, and reaches a value of approximately 2.5 inches of mercury by the time the speed of the vehicle has reached approximately 20 M. P. H., as indicated by the curve 147. It is therefore apparent that the use of differential vacuum for controlling the shift point between intermediate and high speed ratios is more satisfactory than manifold vacuum would be because of the fact that the differential vacuum changes along a regular curve.

Fig. 6 shows differential vacuum curves corresponding to different throttle openings when the throttle is moved to a particular opening and held in this position until the vehicle speed reaches some value above the neighborhood of 40 M. P. H. Reference numeral 145 again is used to indicate the curve corresponding to differential vacuum when the throttle is moved and held in its full open throttle position. Assuming that the vacuum switch is set to operate when the differential vacuum reaches 2.5 inches of mercury, it is apparent from Fig. 5 that the shift from intermediate to high speed ratio will occur at approximately 40 M. P. H. when the throttle is fully open. Reference numeral 148 indicates the curve corresponding to differential vacuum when the vehicle throttle is opened very slightly or cracked and held in this position. It will be noted that the differential vacuum under this condition rises quite rapidly to approximately 2.5 inches of mercury and, as indicated by Fig. 5, the shift from intermediate to high speed ratio will occur in the vicinity of 13 to 14 M. P. H. Reference numerals 149 and 150 represent respectively differential vacuum curves corresponding to throttle opening somewhere between a light throttle opening or slightly beyond the cracked position and a full throttle opening. It is apparent therefore that a shift from intermediate to high speed ratio will be completed at some speed between 13 M. P. H. and 40 M. P. H., depending upon the degree of throttle opening. It will be recalled that the governor switch 103 is set to close at approximately 13 M. P. H. and therefore this controls the lower limit of the speed at which the shift can occur whereas the upper limit of the speed at which the shift can occur is determined by differential vacuum under full open throttle conditions.

From the foregoing description it will be apparent that the present invention provides a simple and unique manner for controlling the automatic shifting of a vehicle transmission from intermediate speed ratio to high speed ratio. Although it is well known to control this shifting by means of manifold vacuum alone, a system utilizing only manifold vacuum is somewhat erratic due to the erratic character of manifold vacuum. By utilizing a combination of manifold vacuum and carburetor vacuum the present invention provides means for controlling the shift from intermediate speed ratio to high speed ratio that takes into account, not only the degree of throttle opening but also the speed of the vehicle. Further the method of controlling the vacuum controlled switch by means of differential vacuum provides a control system wherein the shift point is very conveniently controlled.

It is contemplated that numerous modifications and changes may be made in the present invention without departing from the spirit or scope thereof.

I claim:

1. In a transmission for an automotive vehicle having a driving engine, the combination of a drive shaft, a driven shaft, means for providing a relatively low speed power train between said shafts, means for providing a relatively high speed power train between said shafts, vacuum responsive means for changing the drive through the transmission from one of said power trains to the other in response to changes in vacuum, a carburetor for the driving engine providing a carburetor vacuum therein that varies due to the flow of air through the carburetor, an accelerator for controlling said carburetor, a fuel intake manifold for said engine providing a vacuum therein that changes with engine speed and accelerator position, conduit means connecting said manifold and said carburetor together to provide a differential vacuum in the conduit means that changes differently with engine speed and accelerator position than said manifold vacuum, and conduit means for connecting said first-named conduit means and thereby said manifold and said carburetor with said vacuum responsive means to apply said differential vacuum on the latter for causing changes between said power trains as said differential vacuum changes.

2. In a transmission for an automotive vehicle having a driving engine, the combination of a drive shaft, a driven shaft, means for providing a relatively low speed power train between said shafts, means for providing a relatively high speed power train between said shafts, vacuum responsive means for changing the drive through the transmission from one of said power trains to the other in response to changes in vacuum, a carburetor for the driving engine having a restricted air passage therethrough providing a carburetor vacuum in the restricted passage that varies with the flow of air through the passage, an accelerator for controlling said carburetor, a fuel intake manifold for said engine connected with said carburetor providing a vacuum therein that changes with engine speed and accelerator position, conduit means connecting said carburetor in the vicinity of its said restricted passage therethrough and said manifold together to provide a differential vacuum in the conduit means that changes differently than said manifold vacuum, and conduit means for connecting said first-named conduit means and thereby said manifold and said carburetor with said vacuum responsive means to apply said differential vacuum on the latter for causing changes between said power trains as said differential vacuum changes.

3. In a transmission for an automotive vehicle having a driving engine, the combination of a drive shaft, a driven shaft, means for providing a relatively low speed power train between said shafts, means for providing a relatively high speed power train between said shafts, vacuum responsive means including a diaphragm for changing the drive through the transmission from one of said power trains to the other in response to changes in vacuum on the diaphragm, a carburetor for the driving engine having a restricted throat therein through which air flows and having an opening therethrough into said throat providing a carburetor vacuum that varies due to the flow of air through the carburetor throat, an accelerator for controlling said carburetor, a fuel intake manifold for said engine connected with said carburetor and providing a vacuum therein that changes with engine speed and accelerator position, conduit means connecting said carburetor opening and said manifold together to provide a differential vacuum in the conduit means that changes differently than said manifold vacuum, and conduit means for connecting said first-named conduit means and thereby said manifold and said carburetor with said diaphragm to apply said differential vacuum on the latter for causing changes between said power trains as said differential vacuum changes.

4. In a transmission for an automotive vehicle having a driving engine, the combination of a drive shaft, a driven shaft, means for providing a relatively low speed power train between said shafts, means for providing a relatively high speed power train between said shafts, vacuum responsive means for changing the drive through the transmission from one of said power trains to the other in response to changes in vacuum, a carburetor for the driving engine having an internal passage therethrough providing a carburetor vacuum therein that varies due to the flow of air through the carburetor passage, an accelerator for controlling said carburetor, a fuel intake manifold for said engine connected with said carburetor for providing a vacuum therein that changes with the factor of engine speed and also with the factor of accelerator position, conduit means connecting said internal passage of said carburetor and said manifold together to provide a differential vacuum in the conduit means that changes differently with respect to one of said factors than does said manifold vacuum, and conduit means for connecting said first-named conduit means and thereby said manifold and said carburetor with said vacuum responsive means to apply said differential vacuum on the latter for causing changes between said power trains as said differential vacuum changes.

5. In a transmission for an automotive vehicle having a driving engine, the combination of a drive shaft, a driven shaft, means for providing a relatively low speed power train between said shafts, means for providing a high speed power train between said shafts, vacuum responsive means for changing the drive through the transmission from one of said power trains to the other in response to changes in vacuum, a carburetor for the driving engine providing a carburetor vacuum, an accelerator for controlling said carburetor, a fuel intake manifold for said engine providing a manifold vacuum therein, conduit means connecting said manifold and said carburetor together to provide a differential vacuum that changes with vehicle speed while the accelerator position remains constant, and conduit means for connecting said first-named conduit means with said vacuum responsive means for causing changes between said power trains as said differential vacuum changes.

6. In a transmission for an automotive vehicle having a driving engine, the combination of a drive shaft, a driven shaft, means for providing a relatively low speed power train between said shafts, means for providing a relatively high speed power train between shafts, vacuum responsive means including a diaphragm for changing the drive through the transmission from said low speed power train to said high speed power train in response to an increase in vacuum impressed on said diaphragm, a carburetor for the driving engine having a venturi through which air flows, an accelerator for controlling said carburetor, a fuel intake manifold for said engine providing a manifold vacuum therein, conduit means connecting said manifold and the venturi of said carburetor together to provide a differential vacuum in the conduit means that changes with vehicle speed while the accelerator position remains constant, and conduit means for connecting said first-named conduit means with said vacuum responsive diaphragm for causing changes from said low speed power train to said high speed power train as said differential vacuum increase.

References Cited in the file of this patent

UNITED STATES PATENTS

| | | |
|---|---|---|
| 2,094,449 | Forichon | Sept. 28, 1937 |
| 2,187,824 | Britton | Jan. 23, 1940 |
| 2,220,174 | Ravigneaux | Nov. 5, 1940 |
| 2,229,345 | Schotz | Jan. 21, 1941 |
| 2,281,916 | Claytor | May 5, 1942 |
| 2,362,655 | Mallory | Nov. 14, 1944 |
| 2,377,256 | Mallory | May 29, 1945 |
| 2,380,717 | Beltz | July 31, 1945 |
| 2,407,289 | LaBrie | Sept. 10, 1946 |
| 2,447,730 | Britton | Aug. 24, 1948 |
| 2,485,126 | Wood | Oct. 18, 1949 |
| 2,523,944 | Clary | Sept. 26, 1950 |
| 2,555,702 | Railton | June 5, 1951 |
| 2,562,464 | Jandasek | July 31, 1951 |

FOREIGN PATENTS

| | | |
|---|---|---|
| 154,694 | Great Britain | Nov. 30, 1920 |
| 356,139 | Great Britain | Aug. 27, 1931 |
| 418,587 | Great Britain | Oct. 22, 1934 |
| 513,274 | Great Britain | Oct. 9, 1939 |